(12) United States Patent
Fu et al.

(10) Patent No.: US 6,465,962 B1
(45) Date of Patent: Oct. 15, 2002

(54) VEHICLE AUXILIARY LAMPS INSTALLATION KIT

(76) Inventors: Sam Fu, 14317 E. Don Julian Rd., Industry, CA (US) 91746; Calvin S. Wang, 14317 E. Don Julian Rd., Industry, CA (US) 91746

( * ) Notice: Subject to any disclaimer, the term of this patent is extended or adjusted under 35 U.S.C. 154(b) by 0 days.

(21) Appl. No.: 09/426,007

(22) Filed: Oct. 25, 1999

(51) Int. Cl.[7] ............................................... H05B 37/00
(52) U.S. Cl. ........................... 315/77; 315/82; 362/464; 307/10.8
(58) Field of Search .............................. 315/77, 82, 83; 362/464, 543; 307/10.8

(56) References Cited

U.S. PATENT DOCUMENTS 5,195,813 A * 3/1993 Brown ......................... 362/61
5,231,331 A * 7/1993 Meister ......................... 315/82
5,869,907 A * 2/1999 Marler ......................... 307/10.1

* cited by examiner

Primary Examiner—David Vu
(74) Attorney, Agent, or Firm—Albert O. Cota (57) ABSTRACT

A vehicle auxiliary lamps installation kit (10) that is designed to be operated in combination with a set of auxiliary lamps (26), a vehicle's alternator (34) and a vehicle battery (36). The kit (10), which is designed to be placed and attached within the engine compartment of a vehicle, is disclosed in four design configurations. The first and second designs allow the auxiliary lamps (26) to be manually turned on for a brief period with a remote pocket transmitter (14). In the third and fourth designs the auxiliary lamps (26) automatically turn on when the vehicle's engine is running with the vehicle generator (34) operating. The fourth automatic design also incorporates a photo sensor circuit (40) that causes the auxiliary lamps (26) to turn on only when the ambient lamp level falls to a preselected level such as when darkness appears.

7 Claims, 5 Drawing Sheets

FIG. 5

VEHICLE AUXILIARY LAMPS INSTALLATION KIT

TECHNICAL FIELD

The invention pertains to the general field of vehicle auxiliary lamps and more particularly to a kit which allows auxiliary lamps to be installed and operated in either a manual mode or an automatic mode.

BACKGROUND ART

Arguably, the most common form of transportation is the motor vehicle, and in most developed countries a personal car or truck is the most common motor vehicle. Cars and/or trucks (hereinafter, "vehicles"), are used for transportation to and from work, for reaction, and many other instances when people need to travel.

As vehicles have become more prevalent there has been discovered a need to consistently improve the safety characteristics and to add amenities that add comfort and/or convenience to driving. From the first designs ever considered for vehicles there was seen the need for integral illumination. For any car that was to be driven during non-daylight hours there had to be a means for lighting the road ahead of the car. As a result of this need the obvious addition of headlamps were added to all car designs.

As car designs have evolved, so have headlamps designs. While a typical, dual-headlamp system, with one lamp mounted on each respective side of the front of the car, functions adequately, there has been seen a need for further development. This need was especially noticeable when a car was being driven in inclement weather. During clear nights normal headlamps function fine, and for more visibility most headlamps are available with high and low beams. Unfortunately, even high beams do not always provide satisfactory illumination.

To remedy this problem auxiliary lamps were made available for use on cards. Those auxiliary lamps, which include fog lamps, are designed to provide additional illumination during low-visibility, such as in heavy fog. Many current car manufacturers now provide auxiliary lamps as standard equipment on their new vehicle models. Unfortunately, older vehicles only have the standard two headlamp system.

There are many companies that offer aftermarket auxiliary lamps but, as is most typical, these lamps are not designed to offer any other improvements than increased illumination, while the benefits of additional features such as remote and automatic operation of the auxiliary lamps could be of great assistance to a driver.

A search of the prior art did not disclose any patents that read directly on the claims of the instant invention, however the following U.S. patents are considered related:

| PATENT NO. | INVENTOR | ISSUED |
|---|---|---|
| 5,473,515 | Liu | December 8, 1994 |
| 5,195,813 | Brown | March 23, 1993 |
| 5,193,894 | Christian, et al | June 25, 1992 |
| 5,036,437 | Macks | July 30, 1991 |

The 5,473,515 patent discloses a photo-coupled control apparatus for a vehicle auxiliary lighting system that comprises a combination of a photo coupling set. The set includes a control light emitter assembly and a control light sensor assembly. The control light emitter assembly is attached to the interior surface of the windshield of the vehicle, and has a light emitting device for emitting light signals. The control light sensor assembly is attached to the exterior surface of the windshield at a location opposite the location of the control light emitter assembly, and has a light sensing device for receiving the light signals emitted by the light emitting device of the control light emitter assembly. A control module is coupled to the control light sensor assembly, the battery of the vehicle, and the lamps of the auxiliary lighting systems. When the switch is turned on, the light emitting device of the control light emitter assembly emits the light signals so as to be received by the light sensing deice of the control light sensor assembly. The control light sensor assembly issues a control signal to the control module upon receiving the light signals, whereby the control module providing electric power of the battery to the lamps of the auxiliary lighting system.

The 5,195,813 patent discloses one or more auxiliary lighting systems that are attached to the exterior of a motor vehicle. A control module, located in the engine compartment and connected to the auxiliary lighting system(s) and vehicle, transmits a simple pulse or an encoded signal, depending upon the number of auxiliary lighting systems used. The module includes a receiver and a sensor for detecting the operation of the vehicle's original equipment lighting. Logic within the module turns on the auxiliary lighting upon request in accordance with predetermined conditions, such as low beams but not high beams being turned on.

The 5,193,894 patent discloses an apparatus for controlling the light-range of headlamps of a motor vehicle. The apparatus includes two headlight orientation adjusting devices, at least one electro-optic sensor that detects actual values of light intensities of light reflected from an illuminated portion of the road, and an analyzer/control unit connected to the at least one electro-optic sensor and the adjusting devices to control the adjusting devices and the headlight orientation according to the sensor signal. To maintain the light-range of the headlamps, the analyzer/control unit contains a memory device for storing data including set values of the light intensities for a desired headlight orientation and for storing other data including actual values of the reflected light intensities for actual headlight orientations.

The 5,036,437 patent discloses a vehicle lamp control sensor for switching a lamp on or off, depending on ambient levels. The device employs a silicon photo detector in combination with a filter chosen to give the detector a response curve that peaks at about 550 nanometers. The photo detectors transmits an electrical signal in response to the ambient light and the electrical signal is sensed by a lamp switching circuit to switch the vehicle lamp at predetermined light levels. The vehicle lamp control sensor will thus respond to changes in the ambient light levels in a manner which matches the perceived light levels of a human observer.

DISCLOSURE OF THE INVENTION

The vehicle auxiliary lamps installation kit is designed to be operated in combination with a vehicle which includes an engine, an alternator and a battery. The kit allows the lamps, which can consist of a fog lamps or other type of secondary vehicle lamps, to be manually turned on with the vehicle's engine not running or to be turned on automatically when the vehicle's engine is running with the alternator operating. In its most basic design, the vehicle auxiliary lamps installation kit consists of:

a) at least one auxiliary lamp, and b) Circuit means for producing a turn lamps ON code or a turn lamps OFF code, and subsequently determining if a turn lamps ON or OFF code has been received for further processing. If a turn lamps ON code is received, a 12 VDC lamps power signal is produced that is applied to the at least one auxiliary lamp which causes the lamp to illuminate.

The manual mode of operation is disclosed in two designs. In both designs a remote transmitter is used to activate the kit. The transmitter is battery powered and is similar to the type used for activating and deactivating standard vehicle alarms and for locking/unlocking vehicle doors.

In the first manual design the transmitter produces a unique and encrypted security code corresponding to either a lamps ON command or a lamps OFF command. The code is applied to a receiver from where the encrypted coded signal is passed to a decoder circuit. The decoder circuit decodes and determines if the encrypted coded signal corresponds to a turn lamps ON code or a turn lamps OFF code. The determined code is then applied to a logic control circuit wherein if the turn lamps ON code is received the logic control circuit energizes a power relay which controls a 12 VDC lamps power signal that when applied to the lamps causes them to illuminate.

In the second manual mode design the receiver includes further circuits which allows the receiver to directly produce a turn lamps ON code or a turn lamps OFF code. The produced on or off code is applied to the logic control circuit thus, eliminating the need for the decoder circuit.

The automatic mode of operation is also disclosed in two designs. In both designs the auxiliary lamps will illuminate only when the vehicle's engine is running with the alternator operating.

In the first automatic design a wave detector is used having means for determining if the vehicle's engine is running by detecting a ripple voltage which is produced by the alternator. If the engine is running the wave detector produces a turn lamps ON code which is applied to a logic circuit. The logic circuit produces a turn laps ON code which is applied to a logic control circuit wherefrom a 12 VDC lamps power signal is produced that when applied to the lamp causes them to illuminate.

The second automatic design is comprised of the same elements as the first automatic design but further includes a photo sensor circuit and an amplifier. The photo sensor produces a resistance signal having a value that is equivalent to a value of the applied ambient lamp. The resistance signal is applied to the amplifier which converts the resistance signal to a turn lamps ON or a turn lamps OFF code. When the ambient lamp level drops below a pre-determined level the amplifier produces a turn lamps ON code which is processed as previously discussed for the first automated mode. In this second automatic mode both the coded signals from the logic circuit and the amplifier must be received by the logic control circuit before the logic control circuit can produce the 12 VDC lamps power signal that turns on the lamps.

In view of the above disclosure it is the primary object of the invention to produce a vehicle auxiliary lamps installation kit that can be designed to be operated manually or automatically.

In addition to the primary object of the invention it is also an object of the invention to produce a vehicle auxiliary lamps installation kit that:

can be designed to operate various types of auxiliary vehicle lamps, is easily and conveniently installed with minimum effort within the confines of the engine compartment, can be installed without having to drill any holes in the vehicle fire wall or dash board, and can be designed with discreet components or by utilizing an Application Specific Integrated circuit (ASIC), and is cost effective from both manufacturing and consumer points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the vehicle auxiliary lamps installation kit 10 is presented in terms of a preferred embodiment which is disclosed in four design configurations. The first and second kit designs allow the auxiliary lamps to be manually turned on which the vehicle engine is not running. In the third and fourth designs the auxiliary lamps are automatically turned on when the vehicle's engine is running and the vehicle's alternator is operating.

Figure 1:
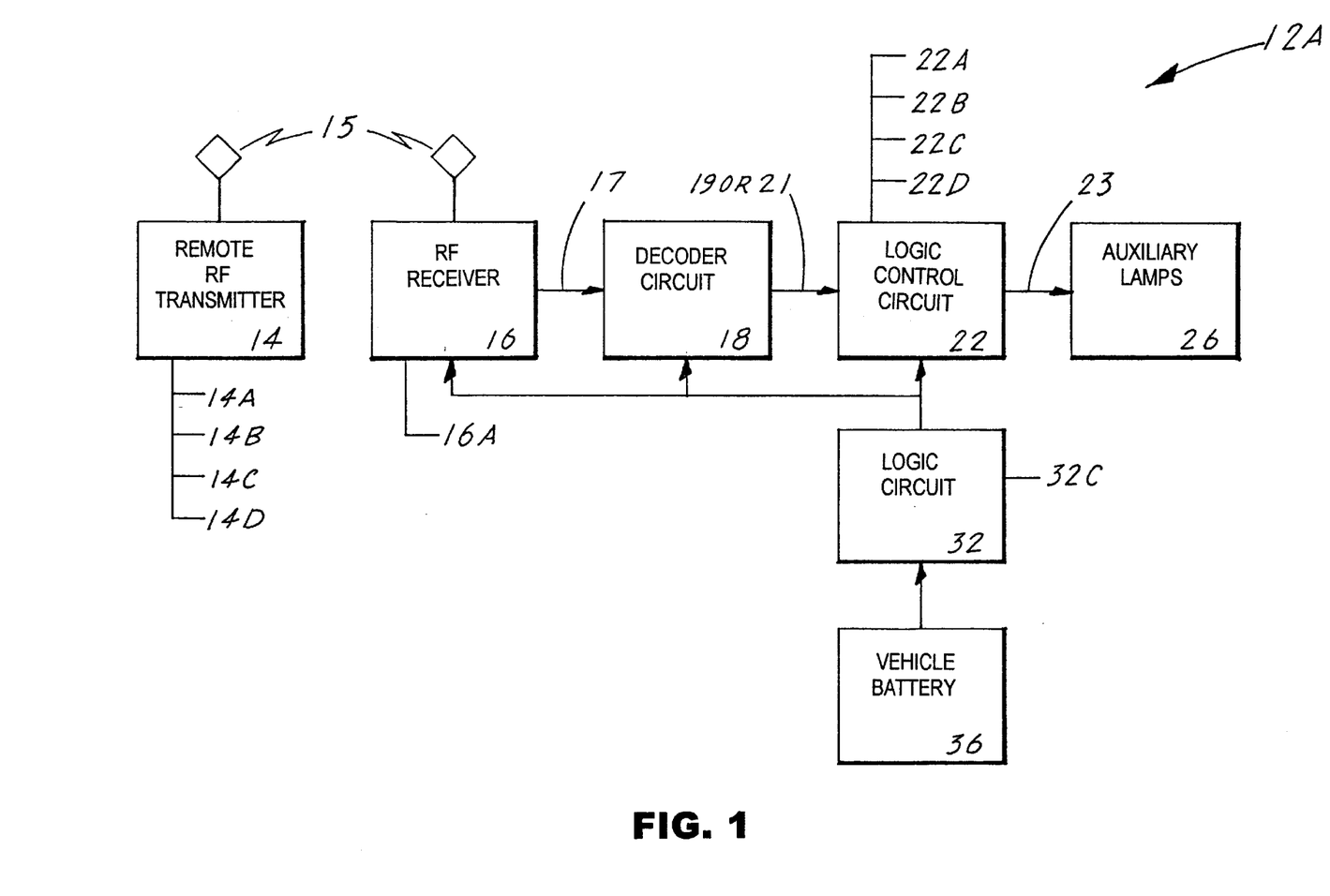
FIG. 1 is a block diagram of the major elements used in the vehicle auxiliary lamps kit when the kit is operated in a first manual mode.

The first kit design, which manually operates the auxiliary lamps is shown in FIG. 1 and is comprised of the following major elements: a lamps control circuit 12A comprising a remote RF transmitter 14, an RF receiver 16, a decoder circuit 18, a logic control circuit 22, a logic circuit 32, a vehicle battery 36 and at least one auxiliary lamp 26 (hereinafter "the lamps 26").

The remote transmitter 14 is similar to the type used for activating and deactivating standard card alarms and for locking and unlocking vehicle doors. The transmitter 14 is self-powered, typically fits in a pocket and includes: an ON button switch 14A, an OFF button switch 14B, an RF oscillator 14C and an encoder 14D.

The RF oscillator 14C is designed to operate within the legal FCC parameters at the legal designated frequency of the country where it is being used and sold. The encoder 14D provides a means for encrypting a security code and modulates the RF carrier signal to produce a modulated RF signal 15. When either of the two button switches 14A,14B are depressed, the RF oscillator is activated and the encoder 14D produces a unique and encrypted security code corresponding to either a lamps ON command or a lamps OFF command.

The modulated RF signal 15 transmitted by the transmitter 14, which incorporates the lamp ON or lamp OFF commands, is received up by the RF receiver. The RF receiver 16 includes a demodulator 16A which demodulates the modulated RF carrier signal 15 and passes an encrypted coded signal 17 to the decoder circuit 18. The decoder circuit 18 includes the means for decoding and determining if the encrypted coded signal 17 corresponds to a turn lamps ON code 19 or a turn lamps OFF code 21. The determined code is then applied to the logic control circuit 22.

The logic control circuit 22 includes a microcontroller 22A, a switching transistor 22B, a current limiting resistor 22C and a power relay 22D. When the microcontroller 22A receives the decoded code from the decoder circuit 18 it determines whether the code is a turn lamps ON code 19 or a turn lamps OFF code 21. If a turn lamps ON code 19 is received the microcontroller 22A produces and applies a logic high output signal (+5V) to the base of the switching transistor 22B through the current limiting resistor 22C. This sequence causes the switching transistor 22B to turn on and energize the power relay 22D which controls a 12 VDC lamps power signal 23 that when applied to the auxiliary lamps 26 causes them to illuminate.

Conversely, when the microcontroller 22A determines that the encrypted code is a turn lamps OFF code 21 the microcontroller 22A produces and applies a logic low (0V) to the base of the switching transistor 22B through the current limiting resistor 22C. This sequence causes the transistor 22B to turn off which de-activates the power relay 22D which is turn cuts off the lamps power signal 23 which causes the auxiliary lamps 26 to turn off.

In addition to its primary mode of operation, the microcontroller 22A can be programmed to perform "code learning" on the "power up". This feature allows additional transmitters 14 to be acquired by a customer to replace lost or missing transmitters 14 without the need to keep track of the security code the customer was initially assigned when the microcontroller was first powered. The microcontroller 22A, when first powered, goes into a "learn mode" and stores the first two security codes that are applied. The two codes are stored until such time that power is removed from the circuit.

In this first design for the manual mode of operation the logic circuit 32 in combination with the vehicle battery 36 provides a regulated voltage via a voltage regulator 32C to power the elements of the lamps control circuit 12A.

Figure 2:
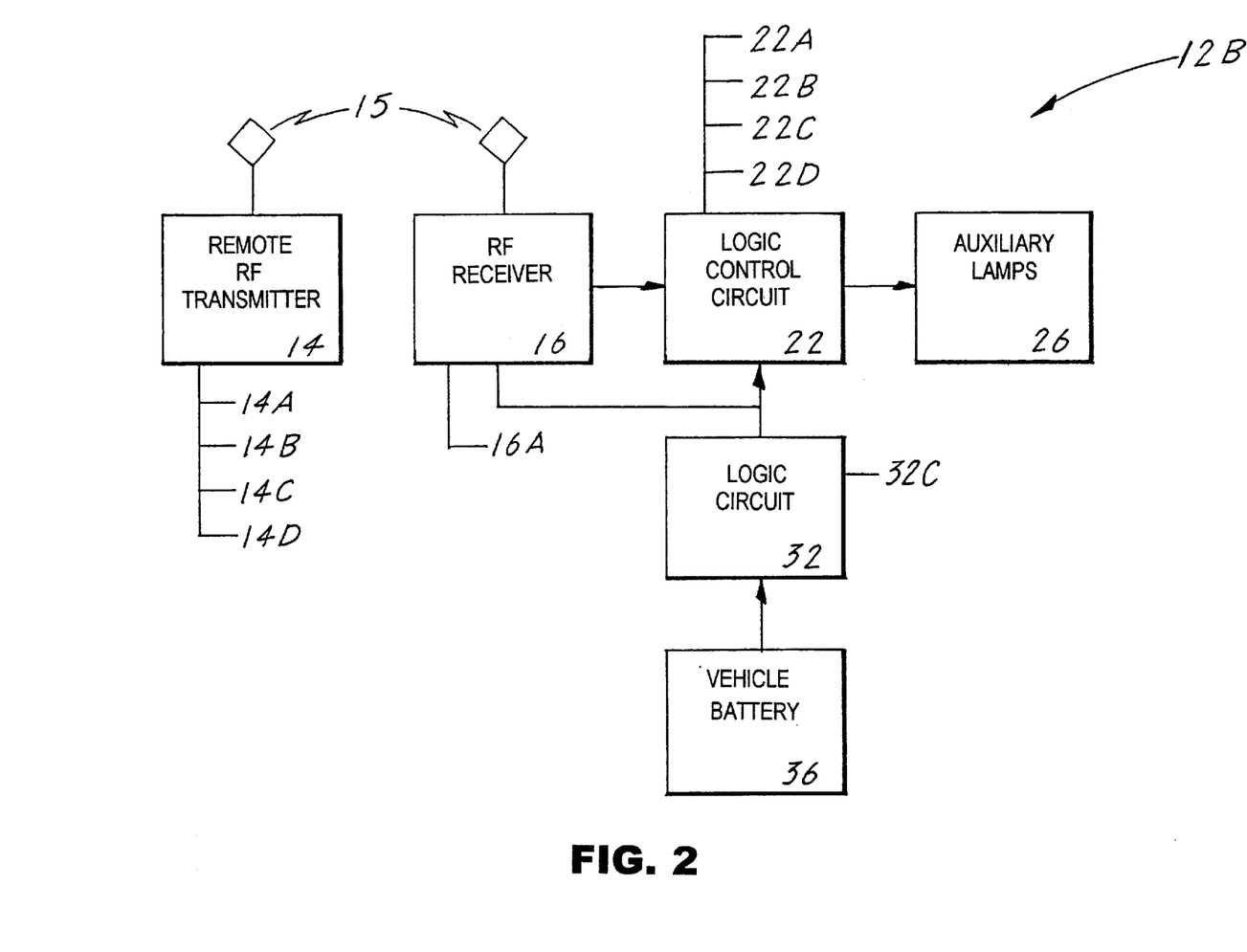
FIG. 2 is a block diagram of the major elements used in the vehicle auxiliary lamps kit when the kit is operated in a second manual mode.

The second design which manually operates the auxiliary lamps 26 is shown in FIG. 2 and is comprised of the following major elements: a lamps control circuit 12B comprising a remote RF transmitter 14, an RF receiver 16, a logic control circuit 22, auxiliary lamps 26, a logic circuit 32, and a vehicle battery 36. All of the above elements, with the exception of the receiver 16, function in a similar matter as described above for the first manual design. Therefore, their function and operation is not repeated.

In this second design, the receiver 16 is designed to directly produce a turn lamps ON code 19 or a turn lamps OFF code 21 that is applied to the microcontroller 22A located in the logic control circuit 22. Thus, eliminating the need for the decoder circuit 18 as is required for the first manual design.

The automatic mode of operation for the kit 10 is disclosed in two design configurations. In both designs the auxiliary lamps 26 illuminate only when the vehicle's engine is running with the alternator operating.

Figure 3:
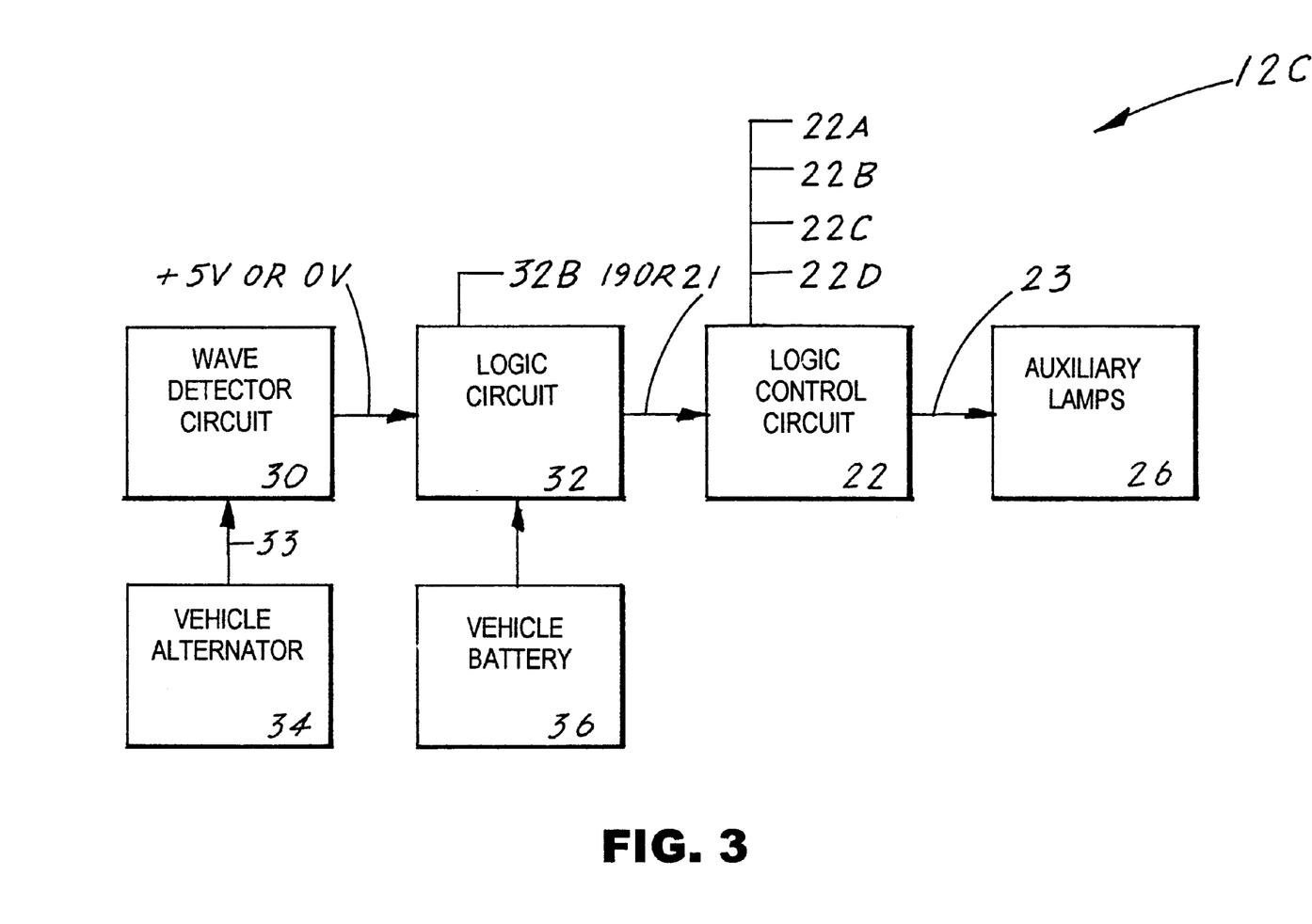
FIG. 3 is a block diagram of the major elements used in the vehicle auxiliary lamps kit when the kit is operated in a first automatic mode.

The first design for operating the kit 10 in the automatic mode is shown in FIG. 3 and is comprised of the following major elements: a lamps control circuit 12C comprising a wave detector circuit 30, a logic circuit 32, a logic control circuit 22, the auxiliary lamps 26, a vehicle alternator 34 and a vehicle battery 36.

The wave detector circuit 30 is connected to the output of the vehicle alternator 34. The circuit 30 includes a means for determining whether the vehicle engine is turning by detecting a ripple voltage 33 which is produced by the alternator 34 only when the vehicle's engine is running. The output of the wave detector circuit 30, which consists of a logic high (+5V) or logic low (0V), is applied to the input of the logic circuit 32.

When the vehicle's engine is running and the alternator 34 operating, the output from the wave detector circuit 30 is the logic high (+5V) signal. The logic high signal is applied to the base of a switching transistor 32B located in the logic circuit 32, thus causing the transistor to turn on and produce a turn lamps ON code 19 signal which is applied to the logic control circuit 22. The application of this signal causes the collector lead of a transistor 22B to go low (0V), which is then passed to the microcontroller 22A in the circuit 22.

The microcontroller 22A produces a logic high (+5V) signal which is applied to the base lead of the switching transistor 22B through a current limiting resistor 22C. This sequence energizes a power relay 22D which controls a 12 VDC lamps power signal 23, that when applied to the auxiliary lamps 26 causes them to illuminate when the vehicle's engine is running.

If the engine is not running, no ripple voltage 33 is detected at the output of the alternator 34. Thus, the output signal from the wave detector circuit 30 is a logic low (0V). The logic low signal is applied to the base lead of the switching transistor 32B in the logic circuit 32. In this state, the transistor 32B is off, which causes the collector lead of the transistor to remain high (+5V). This high 5V signal, which is analogous to a code 21, is passed to the microcontroller where the signal is interpreted by the microcontroller 22A as the vehicle's engine not running. Under these conditions, the microcontroller 22A produces a 0-volts which deactivates the power relay 22D, which then terminates the power signal 23 causing the auxiliary lamps 26 to turn off or to remain off.

Figure 4:
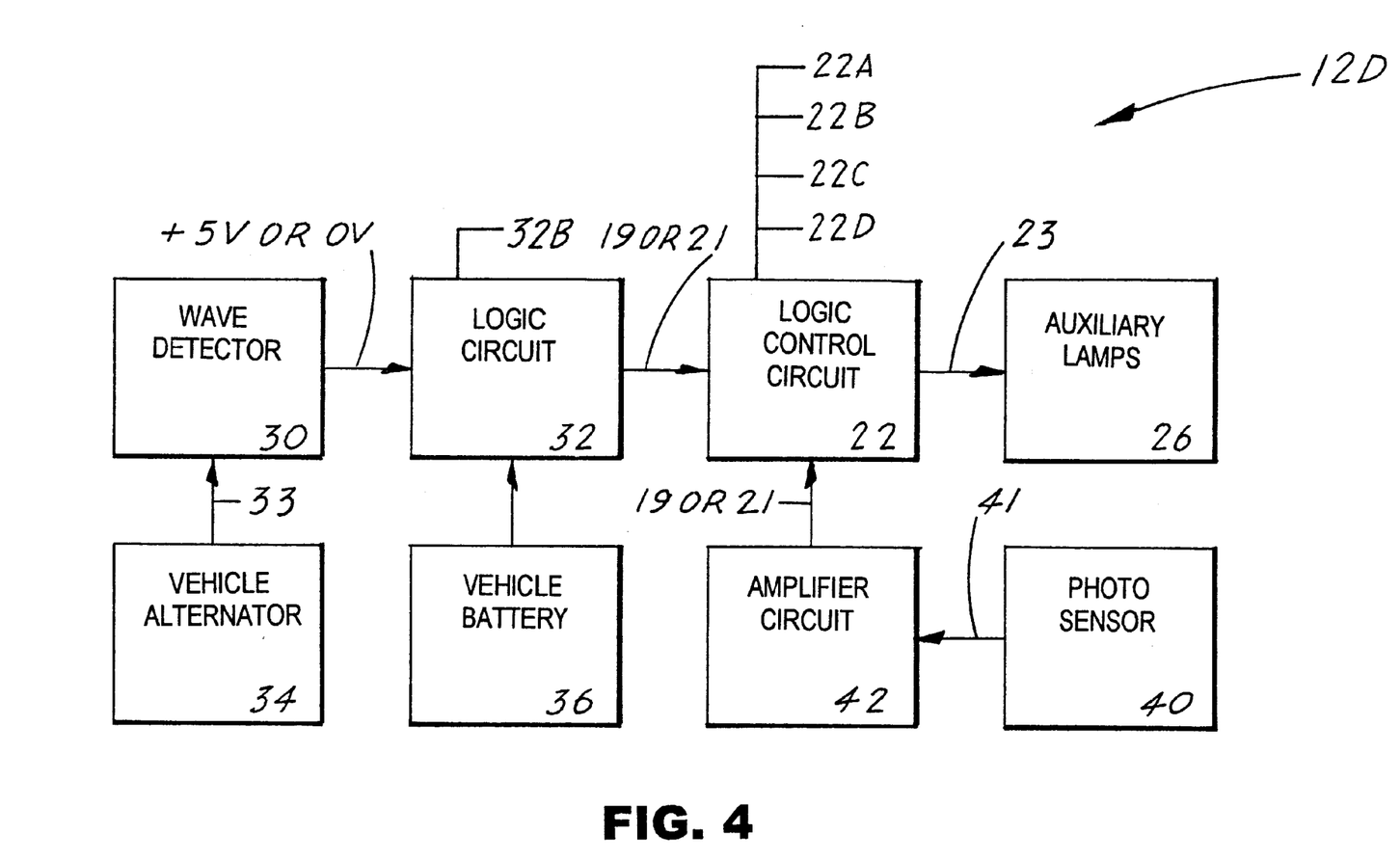
FIG. 4 is a block diagram of the major elements used in the vehicle auxiliary lamps kit when the kit is operated in a second automatic mode.

The second design for operating the kit 10 in the automatic mode is shown in FIG. 4 and is comprised of a lamps control circuit 12D having the same elements as used for the first design of the automatic mode but in addition, incorporates two additional elements: a photo sensor circuit 40 and an amplifier circuit 42.

The photo sensor circuit 40 consists of a lamp sensitive device such as, but not limited to, a cadmium sulfide cell. The lamp sensitive device has an internal resistance that varies in accordance with the changes in the visible region of the electromagnetic spectrum. The output of the photo sensor circuit 40 is a resistance signal 41 having a value that is equivalent to the value of the applied ambient light.

The resistance signal 41 is applied to the input of the amplifier circuit 42 which can consist of an operation amplifier or a transistor amplifier. The circuit 42 has the means for converting the resistance signal 41 to a turn lamps On code 19 or a turn lamps OFF code 21. When the ambient light level drops below a pre-determined level the output signal of the amplifier 42 is a logic 1 (+5V), which is equivalent to a turn lamps ON code 19. Conversely, when the ambient light level goes above a pre-determined level the output signal of the amplifier 42 is a logic 0 (0V), which is equivalent to a turn lamps OFF code 21.

The level of the ambient light can be adjusted and set by means of a variable resistor such as a potentiometer, which is located in the amplifier circuit 42.

The turn lamps ON code 19 or turn lamps OFF code 21 from the amplifier 42 is applied to the logic control circuit 22 concurrently with the code 19 or code 21 from the logic circuit 32. Note that both the 19 or 21 codes from the logic circuit 32 and the amplifier 42 must be received by the logic control circuit 22 before the circuit 22 energizes the power relay 22D which controls the application of a 12 VDC lamps power signal that turns on the lamps 26.

The microcontroller 22A can be programmed for a delayed turn ON or a delayed turn OFF of the auxiliary lamps 26 either in the manual or automatic modes of operation. It can also be programmed to flash the lamps a specific number of times or for a specific amount of time. In the manual mode of operation it is particularly important to turn the lamps 26 OFF after a preselected time period so that battery power is not depleted.

Figure 5:
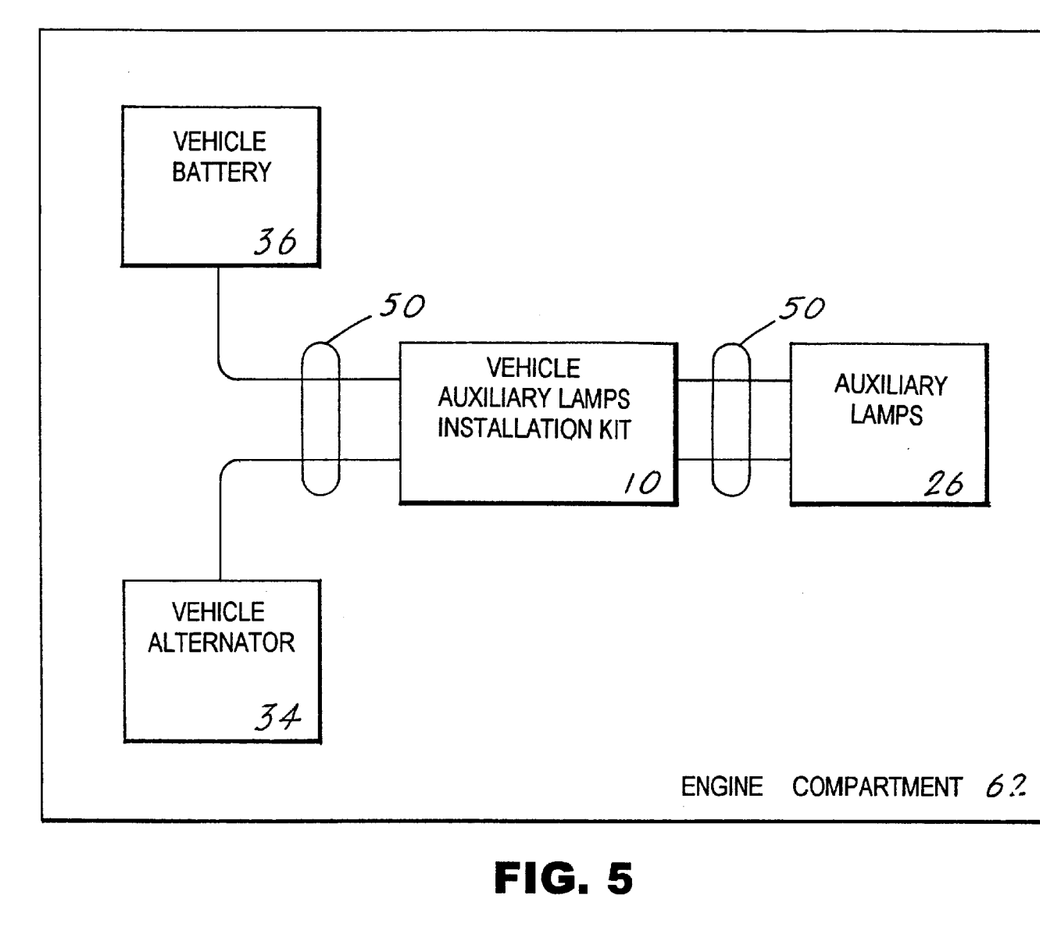
FIG. 5 is a block diagram showing a wiring diagram for installing the vehicle auxiliary lamps installation kit within the hood of a vehicle.

The vehicle auxiliary lamps installation kit 10 is particularly designed to be installed on a vehicle with minimum complexity and effort. The kit 10 is connected via a cable assembly 50 to the vehicle auxiliary lamps 26, the alternator 34 and the vehicle battery 36 as shown in FIG. 5. The kit 10 and all the cable connections can be located and attached within the engine compartment 62 without the need for drilling holes through the vehicle's fire wall or the dashboard.

While the invention has been described in complete detail and pictorially shown in the accompanying drawings it is not to be limited to such details, since many changes and modifications may be made in the invention without departing from the spirit and scope thereof. For example, in lieu of the wave detector circuit 30 a voltage translator circuit can be used. This circuit translates the output of the alternator 34 into a positive corresponding voltage that is directly applied to the logic control circuit 22 wherefrom a lamp power signal is produced that turns on the lamps 26. Conversely, when the alternator is inoperative a corresponding signal from the voltage translator circuit is applied to the circuit 22 which causes the lamps 26 to turn OFF. Hence, it is described to cover any and all modifications and forms which may come within the language and scope of the appended claims.

What is claimed is:

1. A vehicle auxiliary lamps installation kit that operates in combination with a vehicle which includes an engine, an alternator and a battery said kit comprising:
    a) at least one auxiliary lamp, and
    b) circuit means for producing a turn lamps ON code or a turn lamps OFF code and subsequently determining if the turn lamps ON code or the turn lamps OFF code has been received for further processing, wherein if the turn lamps ON code is received, a 12 VDC lamps signal is produced which is applied to said at least one auxiliary lamp to cause said lamp to illuminate, wherein said circuit means is comprised of a manually operated lamps control circuit comprising:
    (1) a remote RF transmitter incorporating an ON button switch, an OFF button switch and means for producing and transmitting a modulated RF signal that is modified by said button switches to produce a unique and encrypted security code corresponding to either a lamps ON command or a lamps OFF command,
    (2) an RF receiver having means for receiving demodulating the modulated RF signal from said transmitter and for producing an encrypted code signal,
    (3) a decoder circuit having means for decoding and determining if the encrypted code signal from said RF receiver is the turn lamps ON code or the turn lamps OFF code,
    (4) a logic control circuit comprising a microcontroller having means for receiving and determining whether the encrypted code from said decoder circuit is the turn lamps ON code or the turn lamps OFF code, if the turn lamps ON code is received said microcontroller produces and applies a logic high output signal to a switching transistor which causes the transistor to turn on and energize a power relay which controls the application of a 12 VDC lamps power signal that turns on said at least one auxiliary lamp, and
    (5) a logic circuit having an input connected to the vehicle battery, wherein the battery voltage is passed on to a voltage regulator from where a regulated power signal is produced that powers the elements of said lamps control circuit.

2. A vehicle auxiliary lamps installation kit that operates in combination with a vehicle which includes an engine, an alternator and a battery said kit comprising:
    a) at least one auxiliary lamp, and
    b) circuit means for producing a turn lamps ON code or a turn lamps OFF code and subsequently determining if the turn lamps ON code or the turn lamps OFF code has been received for further processing, wherein if the turn lamps ON code is received, a 12 VDC lamps power signal is produced which is applied to said at least one auxiliary lamp to cause said lamp to illuminate, wherein said circuit means is comprised of a manually operated lamps control circuit comprising:
    (1) a remote RF transmitter incorporating an ON button switch, an OFF button switch and means for producing and transmitting a modulated RF signal that is modified by said button switches to produce a unique and encrypted security code corresponding to either a lamps ON command or a lamps OFF command,
    (2) an RF receiver having means for receiving and demodulating the modulated RF signal from said transmitter and directly producing the turn lamps ON code or the turn lamps OFF code,
    (3) a logic control circuit comprising a microcontroller having means for receiving and determining whether the encrypted code from said RF receiver circuit is the turn lamps ON code or the turn lamps OFF code, if the turn lamps ON code is received said microcontroller produces and applies a logic high output signal to a switching transistor which causes the transistor to turn on and energize a power relay which controls the application of a 12 VDC lamps power signal that turns on said at least one auxiliary lamp, and
    (4) a logic circuit having an input connected to the vehicle battery, wherein the battery voltage is passed on to a voltage regulator from where a regulated power signal is produced that powers the elements of said lamps control circuit.

3. A vehicle auxiliary lamps installation kit that operates in combination with a vehicle which includes an engine, an alternator and a battery said kit comprising:
    a) at least one auxiliary lamp, and
    b) circuit means for producing a turn lamps ON code or a turn lamps OFF code and subsequently determining if the turn lamps ON code or the turn lamps OFF code has been received for further processing, wherein if the turn lamps ON code is received, a 12 VDC lamps power signal is produced which is applied to said at least one auxiliary lamp to cause said lamp to illuminate, wherein said circuit means is comprised of a lamps control circuit that is automatically activated when the vehicle's engine is running with the vehicle's alternator operating at which time the turn lamps ON code is produced, wherein said lamps control circuit comprises:

(1) a wave detector circuit having an input connected to the output of the vehicle's alternator, wherein said lamps control circuit having means for determining if the vehicle's engine is running by detecting a ripple voltage produced by the alternator when the vehicle's engine is running, wherein said lamps control circuit produces an output signal consisting of either a logic high or a logic low output signal, (2) a logic circuit having means for receiving the output signal from said wave detector circuit and applying the signal to the base of a switching transistor, wherein:
 (a) when the vehicle's engine is running and the vehicle's alternator is operating the output signal from said wave detector circuit is a logic high which is applied to and causes the switching transistor located in said logic circuit to turn on and produce the turn lamps ON code and
 (b) when the vehicle's engine is not running the output signal from said wave detector is a logic low which causes the switching transistor to remain off and produce the turn lamps OFF code, and (3) a logic control circuit comprising a microcontroller having means for receiving and determining whether the coded signal from said logic circuit is the turn lamps ON code or the turn lamps OFF code, if the turn lamps ON code is received said microcontroller produces and applies a logic high output signal to the switching transistor which causes the transistor to turn on and energize a power relay which controls the application of a 12 VDC lamps power signal that turns on said at least one auxiliary lamp, and (4) a logic circuit having an input connected to the vehicle battery, wherein the battery voltage is passed on to a voltage regulator from where a regulated power signal is produced that powers the elements of said lamps control circuit.

4. A vehicle auxiliary lamps installation kit that operates in combination with a vehicle which includes an engine, an alternator and a battery said kit comprising:

a) at least one auxiliary lamp, and
b) circuit means for producing a turn lamps ON code or a turn lamps OFF code and subsequently determining if the turn lamps ON code or the turn lamps OFF code has been received for further processing, wherein if the turn lamps ON code is received, a 12 VDC lamps power signal is produced which is applied to said at least one auxiliary lamp to cause said lamp to illuminate, wherein said circuit means is comprised of a lamps control circuit that is automatically activated when darkness appears at which time the turn lamps ON code is produced, said lamps control circuit comprising:

(1) a wave detector circuit having an input connected to the output of the vehicle's alternator, wherein said wave detector circuit having means for determining whether the vehicle's engine is running by detecting a ripple voltage produced by the alternator when the vehicle's engine is running, wherein said wave detector circuit produces an output signal consisting of either a logic high or a logic low output signal, (2) a logic circuit having means for receiving the output signal from said wave detector circuit and applying the signal to the base of a switching transistor, wherein:
 (a) when the vehicle's engine is running and the vehicle's alternator is operating the output signal from said wave detector circuit goes to a logic high which is applied to and causes the switching transistor located in said logic circuit to turn on and produce the turn lamps ON code, and
 (b) when the vehicle's engine is not running the output signal from said wave detector is a logic low causing the switching transistor to remain OFF and produce the turn lamps OFF code, (3) a photo sensor circuit having an internal resistance that varies in accordance with the changes in the visible region of the electromagnetic spectrum, wherein the output of said photo sensor circuit is a resistance signal, (4) an amplifier circuit having means for receiving and converting the resistance signal to a logic 1 equivalent to the turn lamps ON code or a logic 0 equivalent to the turn lamps OFF code, and (5) a logic control circuit comprising a microcontroller having means for receiving the turn lamps ON code or the turn lamps OFF code concurrently from both said logic circuit and from said amplifier circuit, wherein after both codes are received said microcontroller produces and applies a logic high output signal to a switching transistor which causes the transistor to turn on and energize a power relay which controls the application of a 12 VDC lamps power signal that turns on the lamps.

5. The kit as specified in claim 4 wherein said photo sensor circuit is comprised of a lamp sensitive device which is a cadmium sulfide cell.

6. The kit as specified in claim 4 wherein said amplifier circuit comprise an operational amplifier or a transistor amplifier.

7. The kit as specified in claim 6 wherein said amplifier circuit further comprises a variable resistor designed to adjust and set the level of an ambient light that activates said photo sensor circuit.

* * * * *